3,142,033
REVERBERATION CONTROLLED GAIN AMPLIFIER
John W. Flowers, Gainesville, Fla., and Elmer J. Wade, Scotia, N.Y., assignors, by mesne assignments, to the United States of America as represented by the Secretary of the Navy
Filed Oct. 4, 1950, Ser. No. 188,462
1 Claim. (Cl. 340—3)

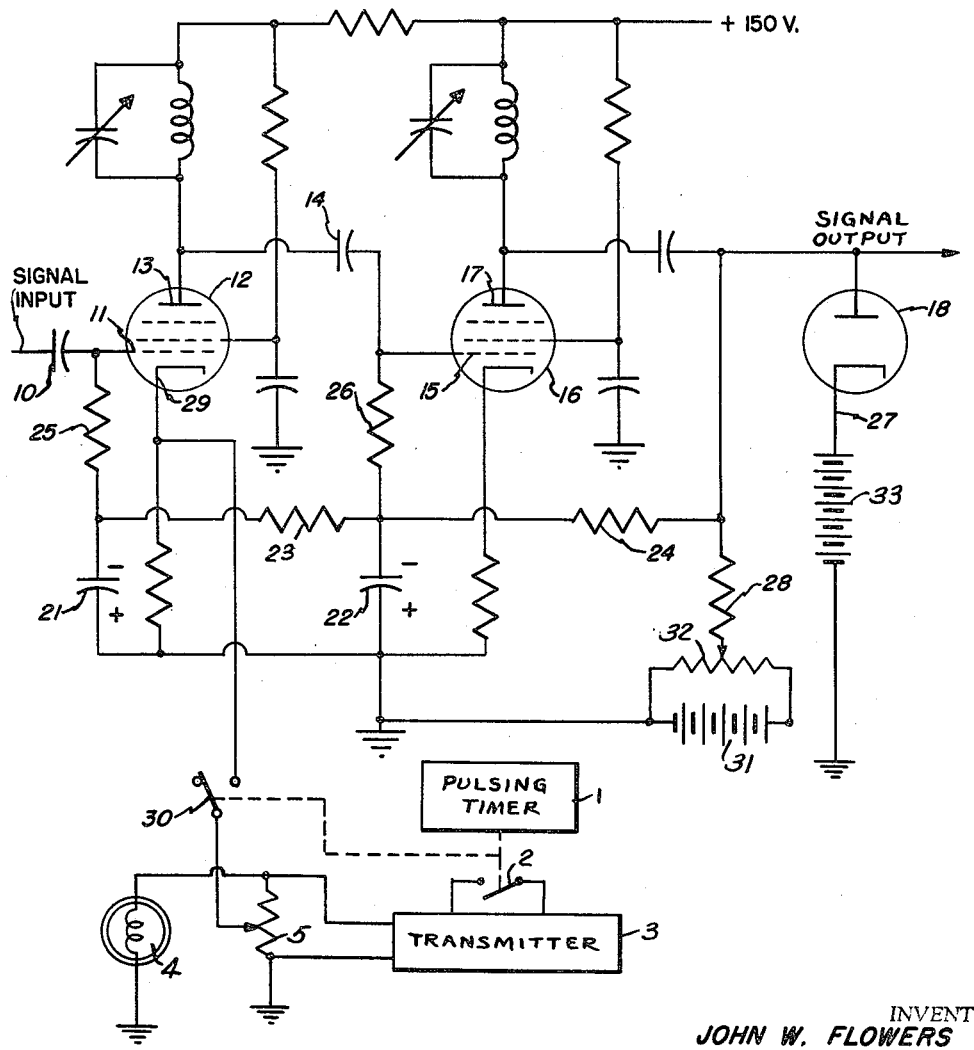

The invention relates to improvements in echo signaling systems and more specifically to a signal amplifier having improved gain control means.

In the operation of an echo controlled torpedo, for example, a transducer in the nose of the torpedo projects short pulses or pings of high frequency energy into the water at regular time intervals. If these pulses strike a target in the water ahead of the torpedo, an echo is reflected back to the transducer which generates an electrical signal voltage corresponding to the reflected acoustic signal. This electric signal is then processed by a receiver having associated circuits which control steering motors adapted to set azimuth and depth rudders and thereby direct the torpedo toward the target.

After the pulses of high frequency power are transmitted underwater, various false echoes are reflected back to the transducer by particles in the water, from thermocline surfaces and from the surface and bottom of the body of water. The strength of these reverberation signals, like that of the true echo signals returning from say a target submarine, tends to decrease exponentially with distance from the point of transmission and therefore with time after transmission, but is nevertheless additionally and unpredictably variable in character. This variable background signal makes the reliable recognition of the true echo signals difficult. If the reverberation had a constant decay characteristic, a receiver having a definite increase in gain with time could be adapted to always disregard the reverberation and still have maximum sensitivity to true echo signals.

To meet a variety of reverberation conditions, it is generally desirable to provide automatic gain control responsive to increasing as well as decreasing reverberation. The automatic gain adjustment to an increasing reverberation signal should not be so rapid that the desired echo is lost, yet adjustment in the opposite direction to a decreasing reverberation signal should not be slower than some average rate at which the true echo signals decrease with range.

An important object of the present invention is to provide a signal amplifier with means automatically adjusting its sensitivity-time characteristic according to the rate of reverberation decay.

Another important object is the provision of a signal amplifier with means automatically adjusting its gain to a value such that the reverberation is insufficiently amplified to produce detection thereof and spurious response thereto while a true echo only slightly greater in amplitude is properly detected.

A further object is to provide a signal amplifier with improved means automatically adjusting its gain for increasing as well as decreasing reverberation and whereby the time constants of the gain adjustments in opposite directions can be made different.

Other object and advantages of the invention will become apparent during the course of the following detailed description, taken in connection with the accompanying drawing forming a part of this specification and in which drawing:

The single figure is a diagrammatic view of the reverberation controlled gain amplifier circuit.

For the purpose of illustration only a preferred embodiment of the invention is shown, forming part of an otherwise conventional underwater echo-ranging apparatus such as employed in active-acoustic homing torpedoes. In such apparatus, pulsing timer 1 operates to repetitively close pinger switch 2 which controls transmitter 3 to generate and apply correspondingly repetitive bursts or pulses of acoustic frequency voltage to transducer 4, giving rise at times to target echo signals, and always giving rise to reverberation in each listening interval between pings. Electrical input signals corresponding to the acoustic echo and reverberation signals, available from the same transducer 4 by means of conventional switching or coupling techniques, or from a separate receiving transducer, not shown, are impressed through an input coupling capacitor 10 on the control grid 11 of a first stage amplifier tube 12 having its plate 13 connected through a coupling capacitor 14 to the control grid 15 of a second stage amplifier tube 16. The amplifier signal output, taken through a coupling capacitor from the plate 17 of the second amplifier stage, is applied to connectional target echo detection and torpedo steering control circuits, not shown in the present application. Except for the modified gain control circuit which, in response to amplifier reverberation output tending to exceed a predetermined level, and by what may be termed feedback charging action, forces the time-variable-gain capacitors 21 and 22 to continuously provide optimum values of bias voltages, the two-stage amplifier may be of conventional configuration, tubes 12 and 16 therein being of pentode type, as indicated.

The amplifier gain at any instant is dependent upon the variable bias voltage applied to the control grids relative to their respective cathodes, thus dependent upon the time-variable voltages developed at capacitors 21 and 22. These capacitors are initially charged negatively at each ping instant as will appear, the charge thereafter tending to decay exponentially but otherwise varying in accordance with the charging-discharging action of the gain control circuit. The latter circuit comprises diode 18, resistors 23, 24 and 28, voltage source 31 and the voltage dividing potentiometer 32 associated therewith, and the delay voltage source 33. Resistor 23 simply provides a D.C. link between the said capacitors, may be of comparatively small ohmic value relative to resistors 24 and 28, and would be omitted in the case of a single-stage amplifier. Aside from the combined magnitude of capacitors 21 and 22, their charging rate is thus principally dependent upon resistor 24 and the effective D.C. component of reverberation appearing at the diode plate end of diode load resistor 28. Similarly, the discharge rate is principally dependent upon serially connected resistos 24 and 28, and the positive voltage acting in series therewith, the latter being variable as indicated to provide adjustment of the discharge rate for various environmental conditions. The network comprising diode 18, diode resistor 28 and delay voltage source 33, serves as a combined rectifier and limiter circuit. In association with the two-stage amplifier and the time-variable-gain capacitors 21 and 22, the diode circuit operates to maintain the reverberation output of the amplifier at a substantially constant level, the delay voltage supplied by source 33 being of the order of say 40 volts and thus relatively large compared to the range of bias voltages necessary for proper amplifier gain control.

The initial gain of the amplifier is adjusted through the application of a presetting voltage to the cathode 29 of the first stage amplifier tube, in such a manner that automatic gain equilibrium is attained. This presetting voltage is derived from the supply of acoustic frequency voltage to the transducer, for example by means of a potentiometer 5 as shown, and applied by cathode injection to the input circuit of the first stage amplifier by closing of a switch 30 synchronized with the usual pinger switch 2. Since the presetting voltage drives cathode 29 alternately positive and negative relative to the grounded end of the cathode resistor, control grid 11 correspondingly experiences oppositely phased voltages relative to cathode 29, the positive excursions at control grid 11 causing electron flow in the control grid circuit and correspondingly charging capacitor 21 negatively as indicated. Capacitor 22 assumes a like charge because of electron flow in the control grid circuit of tube 16, resulting from A.C. voltage applied to control grid 15 by amplifying action of tube 12, and because of resistor 23 which in effect places capacitors 21 and 22 in parallel. The magnitude of the initial bias voltage, and correspondingly the initial gain of the amplifier, is thus related to the power of the transmitted acoustic signal and to the resultant intensity of initial reverberation, providing automatic compensation for variations thereof.

In the operation of the reverberation controlled gain amplifier described herein, the gain presetting charge on the capicitors 21, 22 controlling the initial gain is reduced during the listening period by discharge through the resistor 28 whereby the amplifier gain increases as the reverberation decreases, the rate of discharge of the capacitors initially being so adjusted by means of potentiometer 32 that the rate of gain increase is related to some average rate at which the target echo signals decrease with range. If, in a period of increasing reverberation, incoming reverberation signals are of sufficient magnitude that with the instant gain of the amplifiers the peak voltage of the A.C. output from plate 17 exceeds the 40 volt delay voltage, diode 18 will conduct and provide an effective D.C. component voltage across resistor 28, which impresses a greater negative charge on capacitors 21 and 22, thereby shifting the operating points of grids 11 and 15 in the negative direction and reducing the amplifier gain. Thus, the normal gain increase obtained by the passage of time is modified in accordance with the difference between the peak output voltage and the delay voltage. The values of capacitors 21 and 22 and resistor 24 are such that the time constant of the capacitor charging circuit is large enough to prevent loss of the desired echo. That is, as reverberation increases the amplifier gain is decreased, providing the peak output voltage exceeds the 40 volt delay voltage, but such gain decrease is not so rapid as to remove the desired echo signal. So long as the A.C. component of the plate potential of amplifier 16 remains below 40 volts peak value the A.C. output passed by the coupling condenser to the output line does not affect the existing passive decay characteristic of the capacitor discharge circuit.

Various changes may be made in the form of invention herein shown and described without departing from the spirit of the invention of the scope of the following claim.

What is claimed is:

In a receiver for use in an underwater echo-ranging target-detection system which repetitively generates and projects acoustic energy pulses, wherein said pulses give rise to receiver input signals comprising substantially continuous and initially intense reverberation in each listening interval between pulse generation times, in combination: a signal amplifier to which said input signals are applied, said amplifier including an amplifying device and providing signal gain dependent upon the magnitude of bias voltage applied to a control element of said device; circuit means including a serially connected capacitor for applying, to said control element, a bias voltage variable in accordance with the variable charge condition of said capacitor; means for charging said capacitor, at the times of pulse generation, to provide an initial bias voltage which reduces the magnitude of amplified revereberation at the beginning of each listening interval to substantially a predetermined level; a capacitor discharge circuit comprising first and second resistors and a adjustable first voltage source serially connected across said capacitor; and a diode circuit to which amplified reverberation is coupled from said amplifier, the diode circuit including in serial connection said second resistor and a second voltage source, and providing across said second resistor a charge-modifying voltage which is of polarity tending to augment charge of said capacitor, and which varies in accordance with magnitude of said amplified reverberation relative to said predetermined level; said capacitor discharge circuit tending to reduce said initial bias voltage during each said listening interval in accordance with a predetermined exponential decay characteristic; and said charge-modifying voltage affecting the charge condition of said capacitor and correspondingly the bias voltage, during each said listening interval, to provide regulation of said amplifier gain to values which susbtantially maintain the magnitude of amplified reverberation at said predetermined level.

References Cited in the file of this patent

UNITED STATES PATENTS

| | | |
|---|---|---|
| 2,222,173 | Fritzinger | Nov. 19, 1940 |
| 2,296,626 | Blumlein | Sept. 22, 1942 |
| 2,331,360 | Tuckerman | Oct. 12, 1943 |
| 2,428,039 | Royden | Sept. 30, 1947 |
| 2,532,347 | Stodola | Dec. 5, 1950 |
| 2,539,042 | Torporeck | Jan. 23, 1951 |
| 2,552,586 | Read et al. | May 15, 1951 |

FOREIGN PATENTS

| | | |
|---|---|---|
| 112,270 | Australia | June 29, 1939 |